(12) United States Patent
Hellerstein et al.

(10) Patent No.: US 6,907,426 B2
(45) Date of Patent: Jun. 14, 2005

(54) SYSTEMS AND METHODS FOR IDENTIFYING AND COUNTING INSTANCES OF TEMPORAL PATTERNS

(75) Inventors: Joseph L. Hellerstein, Ossining, NY (US); Sheng Ma, Briarcliff Manor, NY (US); Chang-Shing Perng, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 09/860,154

(22) Filed: May 17, 2001

(65) Prior Publication Data

US 2002/0174083 A1 Nov. 21, 2002

(51) Int. Cl.$^7$ .............................. G06F 7/00; G06N 5/02
(52) U.S. Cl. .............................. 707/6; 707/100; 706/48
(58) Field of Search .................. 707/1–6, 100–102, 707/104.1; 706/45–48, 12; 382/181

(56) References Cited

U.S. PATENT DOCUMENTS

| | | | | |
|---|---|---|---|---|
| 5,742,811 | A | | 4/1998 | Agrawal et al. |
| 5,819,226 | A | | 10/1998 | Gopinathan et al. |
| 5,930,789 | A | * | 7/1999 | Agrawal et al. ............... 707/6 |
| 6,061,682 | A | * | 5/2000 | Agrawal et al. ............... 707/6 |
| 6,185,559 | B1 | * | 2/2001 | Brin et al. ..................... 707/6 |
| 6,189,005 | B1 | * | 2/2001 | Chakrabarti et al. .......... 707/6 |
| 6,272,478 | B1 | * | 8/2001 | Obata et al. ................. 706/12 |
| 6,278,998 | B1 | * | 8/2001 | Ozden et al. .................. 707/6 |
| 6,341,283 | B1 | * | 1/2002 | Yamakawa et al. ........... 707/5 |
| 6,370,520 | B1 | * | 4/2002 | Ruutu et al. .................. 707/1 |
| 6,385,608 | B1 | * | 5/2002 | Mitsuishi et al. ............. 707/6 |
| 6,470,351 | B1 | * | 10/2002 | Ahmadi ..................... 707/102 |
| 6,473,757 | B1 | * | 10/2002 | Garofalakis et al. .......... 707/6 |
| 6,496,817 | B1 | * | 12/2002 | Whang et al. ................ 707/2 |
| 6,553,359 | B1 | * | 4/2003 | Schwenkreis ............... 706/46 |
| 6,718,317 | B1 | * | 4/2004 | Wang et al. ................. 706/50 |

OTHER PUBLICATIONS

H. Mannila et al., "Discovery of frequent episodes in event sequences", Data Mining and Knowledge Discovery, 1997.
H. Mannila et al., "Discovering generalized episodes using minimal occurrences", Second Int'l Conf. on Knowledge Discovery and Data Mining, Portland, Oregon, Aug. 2–4, 1996.
R. Agrawal et al., "Fast Algorithms for Mining Association Rules", Proc. of the 20th Int'l Conf. on Very Large Databases, Santiago, Chile, Sep. 1994.
S. Ma et al., "Mining Partially Periodic Event Patterns With Unknown Periods", Int'l Conf. on Data Engineering, 2001.

* cited by examiner

Primary Examiner—Greta Robinson
Assistant Examiner—Miranda Le
(74) Attorney, Agent, or Firm—Ference & Associates (57) ABSTRACT

Systems and methods for instance counting and for the identification of a temporal pattern in an event sequence. The system addresses the use of "earliest-first" and "no-reuse" policies as criteria for the correctness of counting. The system also achieves higher performance than conventional methods by utilizing incremental computation.

11 Claims, 13 Drawing Sheets

□ SLIDE THE TIME WINDOW TO NEXT EVENT

□ 1 IS A SET OF EVENT TYPES;
  □ (A,T) IS A NEW EVENT MOVING INTO THE ACTIVE WINDOW; A IS AN EVENT TYPE; T IS ITS TIME STAMP.
  □ CACHE(T): A CACHE OF EVENTS IN CURRENT WINDOW, I.E. A LIST OF EVENTS THAT IN [T−W, T]; W IS THE WINDOW SIZE.
  □ COUNT[A]: THE NUMBER OF A IN THE ACTIVE WINDOW.
  □ PATTERNS[A]: A LIST OF PATTERNS THAT CONTAINS A.
  □ FOR EACH P IN PATTERNS[A], THE FOLLOWING INFORMATION IS MAINTAINED

○ P.COUNT:   COUNT OF VALID INSTANCES
    ○ P.ICOUNT:  ITEM COUNT FOR THE CURRENT EXPECTED INSTANCES
    ○ P.LENGTH:  THE NUMBER OF EVENT IN P
    ○ IF P.ICOUNT = P.LENGTH, A QUALIFIED INSTANCE IS FOUND
    ○ P.WAIT[A]: THE SMALLEST NUMBER OF 'A' EVENTS IN CACHE IN ORDER TO REPORT NEXT MATCH.

▲ THE VALUE OF P.WAIT[X] IS AT LEAST 1.
      ▲ IF P.WAIT[A] > COUNT[A], A IS EXPECTED FOR THE CURRENT EXPECTED INSTANCE
      ▲ OTHERWISE, A IS NOT EXPECTED. THIS IMPLIES THAT ANOTHER A IN THE ACTIVE WINDOW HAS BEEN USED FOR THIS EXPECTED INSTANCE.

FIG. 8

1. /*INITIALIZATION*/
   ▫ CACHE[0] = {};
   ▫ FOR A IN 1
     • PATTERNS[A] = {}; COUNT[A] = 0;
   ▫ FOR EACH P
     • P.COUNT = 0; P.ICOUNT = 0;
     • FOR EACH A IN P
       ▴ PATTERNS[A] = PATTERNS(A) U P
       ▴ P.WAIT(A) = 1;
2. GET NEXT EVENT (A,T)/*MOVE THE ACTIVE WINDOW TO THE NEXT EVENT
3. DROPLIST = {E ε E IN CACHE AND E.TIME < T−W};
4. UPDATECACHE(); /*UPDATE CACHE FOR THE CURRENT ACTIVE WINDOW*/
5. PROCESSDROPLIST(); /*PROCESS EVENTS MOVE OUT OF ACTIVE WINDOW*/
6. PROCESSADDLIST(); /*PROCESS A THAT MOVES INTO THE WINDOW*/
7. GO BACK (2) UNTIL ALL EVENTS HAVE BEEN PROCESSED

FIG. 9

```
/*PROCESSDROPLIST*/
FOR EACH B IN DROPLIST
  □ FOR EACH P CONTAINING IN PATTERNS[B]
    ○ IF B IS NOT EXPECTED BY P, /*B WAS COUNTED IN THIS EXPECTED INSTANCE,
      NOW, B MOVES OUT, AND THUS IS NOT IN THIS EXPECTED INSTANCE*/
      ▲ IF COUNT[B] = 1  /*ONE B IN THE WINDOW*/
          –P.ICOUNT--;    /*P.WAIT[B] MUST BE 1; */
      ▲ ELSE              /*USE NEXT AVAILABLE B FOR THIS EXPECTED INSTANCE*/
          –P.WAIT[B]--;   /*P.WAIT[B] IS NOT 1; */
    ○ ELSE/*IF B IS EXPECTED BY P, THIS B MUST BELONG TO THE PREVIOUS
      INSTANCE. SO, DO NOTHING HERE*/
  □ COUNT[B] --;

EXPECTED(X)
  □ RETURN COUNT(X)<WAIT(X)
```

FIG. 10

```
/*PROCESSADDLIST*/
COUNT(A) ++;
FOR EACH P CONTAINING IN PATTERNS(A)
    /*CASE 1; A IS EXPECTED BY P*/
    IF A IS EXPECTED BY P
        P.ICOUNT ++;
        IF P.ICOUNT = P.LENGTH    /*A QUALIFIED INSTANCE HAS BEEN FOUND*/
            P.COUNT ++;                /*INCREMENT INSTANCE COUNT*/
            // P.ICOUNT =0;              /*ITEM COUNT IS 0*/
            FOR C IN P
                WAIT(C) ++;
                IF P.EXPECTED(C) /* TAKE OUT THOSE STILL BEING EXPECTED
                    P.ICOUNT -;

/*CASE 2: A IS NOT EXPECTED BY P; THEN DO NOTHING*/
```

INPUT: (A,1),(A,2),(B,2),(C,3),(D,3),(B,5),(A,5),(D,6),(C,6)

PATTERN: {A,B,C}

| STEP | CACHE | ADDING | DROPING | P.COUNT | P.ICOUNT | COUNT(A) | P.WAIT(A) | COUNT(B) | P.WAIT(B) | COUNT(C) | P.WAIT(C) |
|---|---|---|---|---|---|---|---|---|---|---|---|
| 1 | {} | {(A,1)} | {} | 0 | 0 | 0 | – | 0 | – | 0 | – |
| 2 | {(A,1)} | {(A,2),(B,2)} | {} | 0 | 1 | 1 | 1 | 0 | 1 | 0 | 1 |
| 3 | {(A,1),(A,2)} | {(B,2)} | {} | 0 | 1 | 2 | 1 | 0 | 1 | 0 | 1 |
| 4 | {(A,1),(A,2),(B,2)} | {(C,3)} | {} | 0 | 2 | 2 | 1 | 1 | 1 | 0 | 1 |
| 5 | {(A,1),(A,2),(B,2)} | {} | {} | 0 | 2 | 2 | 1 | 1 | 1 | 0 | 1 |
| 6 | {(A,1),(A,2),(B,2),(C,3)} | {} | {} | 0 | 3 | 2 | 2 | 1 | 1 | 1 | 1 |
| 7 | {(A,1),(A,2),(B,2),(C,3)} | {(B,5),(A,5)} | {(A,1)} | 1 | 1 | 2 | 2 | 1 | 2 | 1 | 2 |
| 8 | {(A,2),(B,2),(C,3)} | {(B,5),(A,5)} | {} | 1 | 1 | 1 | 2 | 1 | 2 | 1 | 2 |
| 9 | {(A,2),(B,2),(C,3),(B,5)} | {(A,5)} | {} | 1 | 2 | 1 | 2 | 2 | 2 | 1 | 2 |
| 10 | {(A,2),(B,2),(C,3),(B,5),(A,5)} | {(C,6)} | {} | 1 | 2 | 2 | 2 | 2 | 2 | 1 | 2 |
| 11 | {(B,2),(C,3),(B,5),(A,5)} | {(C,6)} | {(A,2),(B,2)} | 1 | 2 | 2 | 1 | 2 | 2 | 1 | 2 |
| 12 | {(C,3),(B,5),(A,5)} | {(C,6)} | {(B,2)} | 1 | 2 | 2 | 1 | 1 | 2 | 1 | 2 |
| 13 | {(B,5),(A,5),(C,6)} | {} | {} | 1 | 3 | 2 | 1 | 1 | 1 | 2 | 2 |
| 14 | {(C,3),(B,5),(A,5),(C,6)} | {} | {} | 2 | 3 | 1 | 2 | 1 | 2 | 2 | 3 |
| 15 | EXPECTED |  |  |  |  |  |  |  |  |  |  |
| 16 | UNEXPECTED |  |  |  |  |  |  |  |  |  |  |

SYSTEMS AND METHODS FOR IDENTIFYING AND COUNTING INSTANCES OF TEMPORAL PATTERNS

FIELD OF THE INVENTION

The present invention relates generally to data mining and knowledge discovery for association-relationship discovery or causality detection on sequential data, with or without a time stamp marked on each event.

BACKGROUND OF THE INVENTION

Technology now permits one to collect and store vast quantities of data at reasonable cost. This contributed to an ever-increasing demand to find patterns, trends and anomalies in an event sequence generated by scientific measurements, socioeconomic activity and computer networks. Various algorithms have been developed recently to discover regularities and recurring patterns in an event sequence. (See, for example, Heikki Mannila, Hannu Toivonen, and A. Inkeri Verkamo, "Discovery of frequent episodes in event sequences", Data Mining and Knowledge Discovery, 1997; Heikki Mannila and Hannu Toivonen, "Discovering generalized episodes using minimal occurrences", Second International Conference on Knowledge Discovery and Data Mining, Portland, Oreg., Aug. 2–4, 1996; R. Agrawal, R. Srikant: "Fast Algorithms for Mining Association Rules", Proc. of the 20th Int'l Conference on Very Large Databases, Santiago, Chile, September 1994; R. Agrawal, R. Srikant: "Mining Sequential Patterns", Proc. of the Int'l Conference on Data Engineering [ICDE], Taipei, Taiwan, March 1995 [Expanded version available as R. Agrawal, R. Srikant, "System and Method for Mining Sequential Patterns in a large Database", U.S. Pat. No. 5,819,226, Issued Oct. 6, 1998 [Filed Mar. 3, 1995]; and R. Srikant, R. Agrawal: "Mining Sequential Patterns: Generalizations and Performance Improvements", in Proc. of the Fifth Int'l Conference on Extending Database Technology [EDBT], Avignon, France, March 1996 [Expanded version available as R. Agrawal, R. Srikant, "Method and System for Mining Generalized Sequential Pattern in a Large Database", U.S. Pat. No. 5,742,811, Issued Apr. 21, 1998 [Filed Oct. 10, 1995].) For example, temporal association discovery (see any of the aforementioned references) can find a set of events that can predict another set of events.

Generally, all the conventional algorithms discussed require a basic operation of identifying and counting the instances of patterns. Unfortunately, such basic operations are not usually straightforward for a large amount of temporal data, and have not been formally addressed before.

Accordingly, a need has been recognized in connection with providing a method and system for counting and identifying the instances of patterns in an event sequence with correctness and efficiency. The former requires that there is no ambiguity for determining the instances of a pattern. The latter address the computational efficiency when analyzing a large amount of data that can not be loaded into main memory.

Algorithms have been developed recently to discover significant patterns, such as the association rule (see Agrawal et al., [Santiago], Agrawal et al. [Taipei], and Srikant et al., supra), the frequent episode (see Mannila et al. 1997 and Mannila et al. 1996, supra). the periodic pattern (see Ma et al., supra), and the m-pattern (see Ma et al., "Mining Partially Periodic Event Patterns With Unknown Periods." International Conference on Data Engeneering, 2001). from an event sequence of many applications. For an example, to analyze consumer behaviors, retailers (online stores or brick-and-mortar stores) may wish to know what items are likely to be purchased after observing the purchase of a set of merchandise by a consumer. A well-known example discussed in Agrawal et al. (Taipei), supra, is that a customer who bought Isaac Asimov's "Foundation" is likely to buy "Foundation and Empire" in the near future and than buy "Second Foundation", all of which are essentially books in the same series. With this type of knowledge, retailers can promote a book to potential buyers, and increase availability according to customers' requests. For another example, a modern enterprise computer network includes thousands of servers, printers, workstations, routers, hubs, switches, handheld devices, etc. which are connected together. Most of these devices can emit symptom events (or "alarms") when a problem arises. Far example, when a router is down, the attached devices may send the alarm "cannot reach destination". To manage such a complex system, the alarms are forwarded to an event handling server which can correlate events, and take appropriate action, e.g. page the responsible system administrator or launch error-recovery programs. Accordingly, for the aforementioned router down problem, a need has been recognized in connection with correlating all symptom events, and to issue one "trouble ticket". In so doing, one may identify events that tend to occur together. Such knowledge may help event handling servers to correlate events that represent the symptoms of a problem so as to avoid multiple trouble tickets for a single problem. Furthermore, It may help system administrators to Identify the leading indicators of severe problems in order to take appropriate, proactive action.

In the cases discussed above, identifying and counting the instances of patterns is essentially an unavoidable operation in the pattern discovery process. Further, instance identification is at the core of knowledge validation from data. For example, in system management, experienced operational staff can often have some hypotheses about event relationships. To validate the significance of such hypotheses, it is recognized that an important step may be to find whether such event relationships, i.e. patterns, exist in historical data, and further how many times and when such patterns occur. By knowing such information, the operational staff could take appropriate action. For example, if such a pattern never occurred before, or perhaps occurred in a different manner, no action may be needed. Conversely, if many instances have been found in a critical business cycle, this provides strong motivation for correlating and reporting the associated events.

Figure 3:
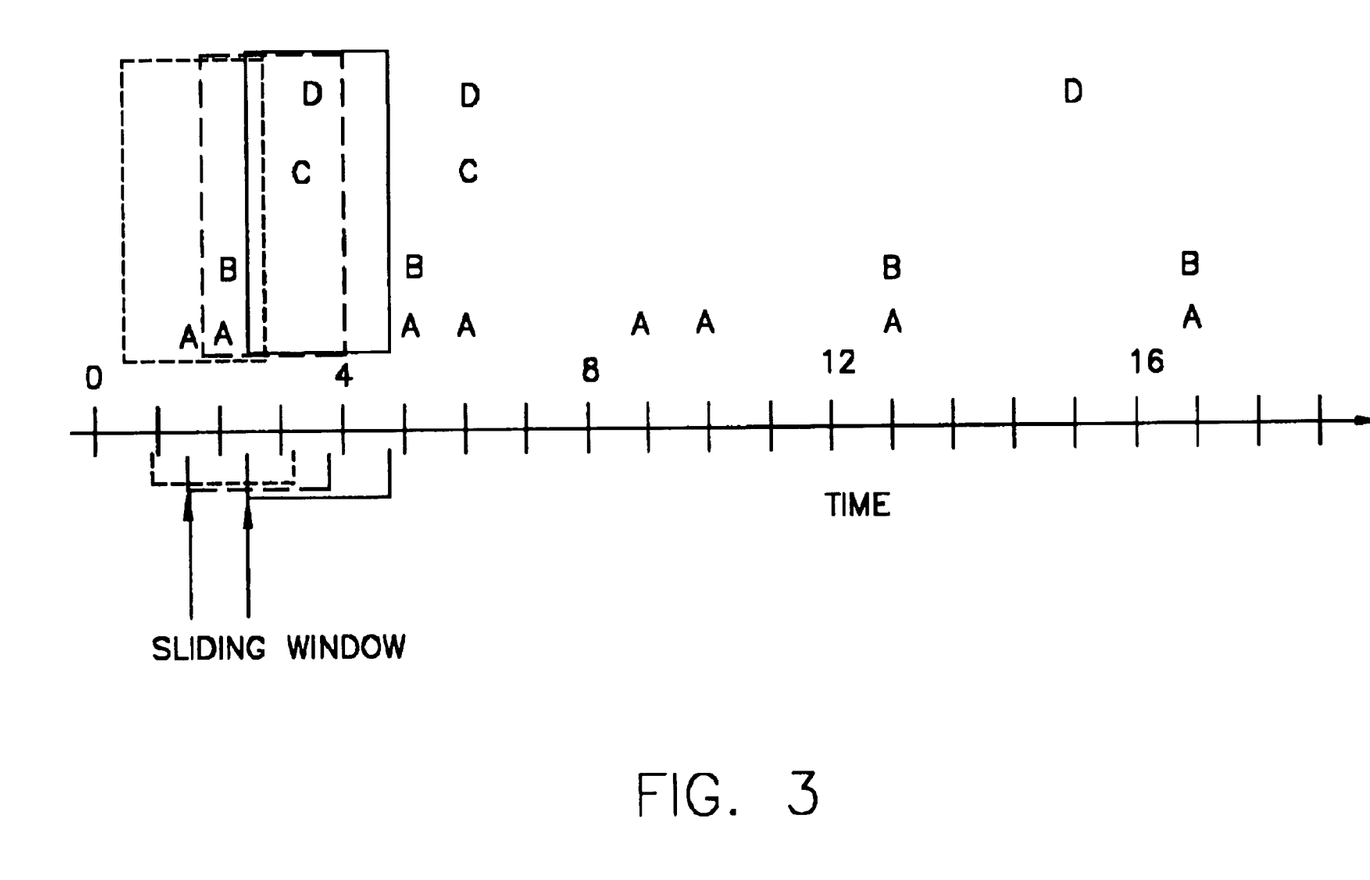
FIG. 3 illustrates patterns and sliding windows.

To further define a problem addressed herein, FIG. 3 shows an illustrative event sequence S={(a,1), (a,2), (b,2), (c,3), (d,3), (b,5), (a,5), (d,6), (c,6), (a,6), (a,9), (a,11), (b,13), (a,13), (b,17), (a,17)}. An event sequence is an ordered collection of events, each of which is a tuple of type called item and time stamp. Thus, a tuple is a sequence of attribute values and, here, each tuple contains two values, the first one of which is the value of the attribute "item" (e.g. a, b, c, . . . ), and the second one of which is the timestamp (e.g. 1, 2, 3, 5 . . . ).

In this example, the set of distinct items is I={a, b, c, d}. (a, 1) means that item a occurs at time 1. In FIG. 3, the type of an event is labeled above its occurrence time. A temporal pattern refers to a set of ordered or unordered items with a time window w. For example, {a,b} is a temporal pattern. One may note that an item may represent a set of attribute values of an original data object. For example, in a computer system, an alarm usually has three attributes: a host name for indicating who emits this alarm, an alarm type for representing what happens, and a time stamp. One may encode the pair of a host name and an alarm type to an item. In this way, a "port down" alarm sent by host X has a different item type than a "port down" alarm sent by host Y.

In the present illustrative example, one may be interested in finding patterns that often occur together. Thus, to qualify a frequent pattern, one needs to determine $\#\{a,b\}$, the number of the instances of a pattern in data, and then set a threshold for finding out all patterns above the threshold. In the illustrative example, assume the threshold is 3. One can find that a and b occur together four times, and thus may considered a frequent pattern. Furthermore, one may be interested in finding strong dependency. For example, the occurrences of b may highly imply the occurrences of a. The dependency strength can be quantified by $\#(\{A,B\})/\#(\{A\})$ and $\#(\{A,B\})/\#(\{B\})$, where $\#(\{A\})$ and $\#(\{A,B\})$ are the numbers of the instances of pattern $\{A\}$ and $\{A,B\}$, respectively. Thus, it is desirable to identify and count the instances of a and b.

The correctness of the counting algorithm determines whether one can find correct patterns. Incorrect counting can easily result in invalid patterns. For example, redundant counting may cause dependency strength higher than 1, which belies the meaning of dependency strength.

Typically, the identification and counting of the instances of patterns tends not to be straightforward. There are at least three reasons that account for this.

First, an instance of a pattern may start at any time slot. Addressing this requires a sliding window and identifying the instances of a pattern in each window. However, this may result in multiple counting. To understand this, one may note that the same event may appear in multiple overlapped windows. For example, pattern $\{a,b\}$ appears in both window 1 and 2. In this case, there is only one instance rather than two.

Second, several instances may occur in a window. This may result in ambiguity for determining the instances of patterns. This can be illustrated by an example shown in FIG. 5. Assume that the current time window contains a set of events $\{a1, a2, b1, b2\}$, wherein the subscripts indicate instances of events. Here, it is not clear whether "a1" or "a2" is in the instance of $\{a,b\}$, and how many instances there are of $\{a, b\}$, whether one or two.

Third, a need has been recognized in connection with developing an algorithm that can deal with a large amount of temporal data. This implies that one cannot load all the data into the main memory, nor access events directly without a high penalty. Rather, data has to usually be left in a local disc, so that data can then be accessed sequentially. In this case, as disk I/O is a relative expensive operation, one should preferably optimize the number of disk accesses by minimizing the number of data scans.

Conventional arrangements tend not to address the aforementioned issues and problems particularly well. For instance, algorithms have been developed to convert temporal data into baskets using sliding windows, and then baskets are counted that contain the pattern. Such an approach has at least two drawbacks. First, the baskets are highly overlapped, as discussed previously. This results in redundant counts. Second, the algorithm is not efficient because of redundant events are examined multiple times. It appears that the latter consideration motivated Mannila et al. (1996) to develop a sequential counting algorithm. Although it could be said that such an algorithm is conceptually efficient, the algorithm still tries to count the overlapped baskets, so thus suffers the same problems as the first algorithm. Further, it has been found that conventional algorithms, at any rate, cannot handle the complex, yet common occurring situation in which multiple instances may reside in a time window.

In summary, instance counting and identification represent fundamental issues in pattern discovery, probabilistic reasoning, and data analysis for temporal data. Erroneous counting results undermine any subsequent analysis based on it. Accordingly, a need has been recognized in connection with providing a system and a method that solves this problem correctly and efficiently.

SUMMARY OF THE INVENTION

In accordance with at least one presently preferred embodiment of the present invention, a method and system are provided to count and identify temporal pattern instances in event logs. The problems encountered in connection with conventional arrangements can be avoided by:

(1) applying policies for resolving possible ambiguity; and (2) developing a sequential counting algorithm, which optimizes data scan and memory usage while maintaining correctness.

For (1), two policies may preferably be developed in a manner to reasonably avoid ambiguity, namely:

(a) "No Reuse". By way of background, one event counted in many pattern instances is a major source of erroneous result. For example, in a window with content $\{A,B,B\}$, if event A is allowed to be counted twice in counting pattern $\{A,B\ \}$, then the count result is 2. Then when the question is asked, "How likely is event B to occur in the same window where A occur?", the following calculation usually takes place:

(Count of $\{A,B\}$)/(Count of $\{A\}$)

Since the count of $\{A\}$ is 1, the result is a probability greater than 1, clearly incorrect. The "no reuse" policy is aimed to avoid such erroneous results by preventing the same event to be counted in more than one instance of pattern.

(b) "Earliest First". Here, in order to obtain a unique counting from given event logs, the "no reuse" policy alone may not be sufficient. If one takes an event log $\{A1, A2,B1,B2\}$, for example, assume that the time between the first A event, A1, and the last B event, B2, is longer than the window length; i.e., $\{A1,B2\}$ is not an instance of $\{A,B\}$, and the time between any other pair of events is shorter than the window length. The instance set of pattern $\{A,B\}$ can be $\{\{A1,B1\}, \{A2,B2\}\}$, $\{\{A2,B1\}\}$ or $\{\{A2,B2\}\}$. This non-determinism not only causes different instance sets, but it also causes a non-unique count. The "earliest first" policy is intended to make the result unique regardless of the counting algorithm used. This policy prescribes that, among all possible pattern instances, the instance containing events with the earliest timestamp should always be picked. Hence in the above example, the instance to be picked first is $\{A1,B1\}$. The other events, $\{A2,B2\}$, happen to represent another instance, so the instance set should be $\{\{A1,B1\}, \{A2,B2\}\}$, whereby all other alternatives violate this policy.

It can be shown that these two policies, if used together, can guarantee unambiguous counting and instance identification.

In order to develop an efficient algorithm for counting and identifying instances of patterns from a large amount of events, several observations can be made. First, since the data may well be extensive, it is usually the case that one can only load data sequentially. Once data is loaded, it should preferably be processed, and then discarded. Second, only events within a window size w may be related. Thus, it is sufficient to cache only events in previous w time slots by using a local buffer. In other words, one may not need to use all events for identifying and counting instances. Third, in order to enforce the "no reuse" and "earliest first" policies, one may need to keep track of the state of each pattern, and also keep track of all redundant instances. Forth, patterns may share common items. Therefore, a data structure is needed for avoiding any redundant comparison.

Based on these observations, an algorithm is contemplated herein that sequentially scans data. The algorithm only requires a local cache whose size is the maximum number of events contained in a time window. One may also design "per pattern" data structures to keep track the states of each pattern. For further gains in efficiency, one may design an indexing scheme for quick retrieving patterns related to the same set of events. The algorithm proposed herein not only correctly counts pattern instances, but also performs the counting more efficiently than conventional methods. The performance gain is largely from utilizing incremental computation.

In one aspect, the present invention provides a data-mining system comprising: an arrangement for counting and identifying instances of temporal patterns; the counting and identifying arrangement comprising: at least one component which identifies temporal pattern instances; and an arrangement for caching events.

In another aspect, the present invention provides a method of facilitating data-mining, the method comprising the steps of: counting and identifying instances of temporal patterns; the counting and identifying step comprising: identifying temporal pattern instances; and caching events.

Furthermore, in an additional aspect, the present invention provides a program storage device readable by machine, tangibly embodying a program of instructions executable by the machine to perform method steps for facilitating data-mining, the method comprising the steps of: counting and identifying instances of temporal patterns; the counting and identifying step comprising: identifying temporal pattern instances; and caching events.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Herebelow, the role played by counting algorithms is explained. Thence, two proposed "policies" are discussed. Thence, counting algorithm in discussed. Finally, the algorithm is illustrated by way of a working example.

Figure 1:
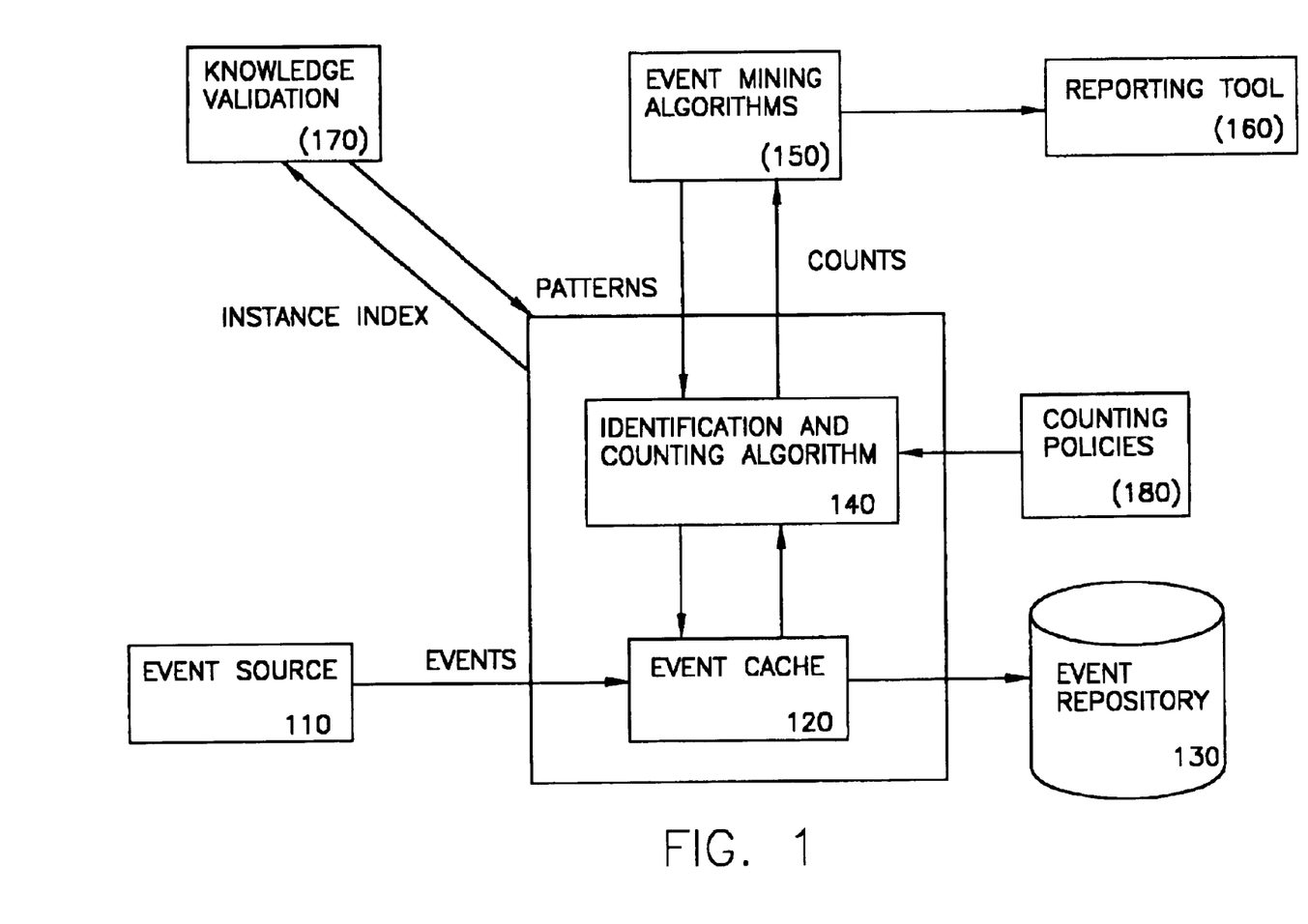
FIG. 1 illustrates online event mining.

FIG. 1 illustrates the role that a counting algorithm may play in online event mining. Incoming events from an event source (110) are temporally stored in a local cache (120) that also represents a window, i.e. a fixed duration of event history. Assume that the system defines the window size to be w. The event cache preferably works in such a way that at time T, the cache holds all and only events with timestamp between T−w and T. The counting policies (180) define a set of policies to be used for resolving possible conflicts for ensuring uniqueness. The counting algorithm (140) enforces the policies, and count patterns defined by either the event mining engine (150) or the knowledge validation engine (170). The counting algorithm access events in the event cache (120). The event mining engine (150) and the knowledge validation engine (170) are responsible for preparing pattern candidates for the counting algorithm to verify. Events occurring outside of the current window are preferably stored in a event repository (130) for further analysis.

Figure 2:
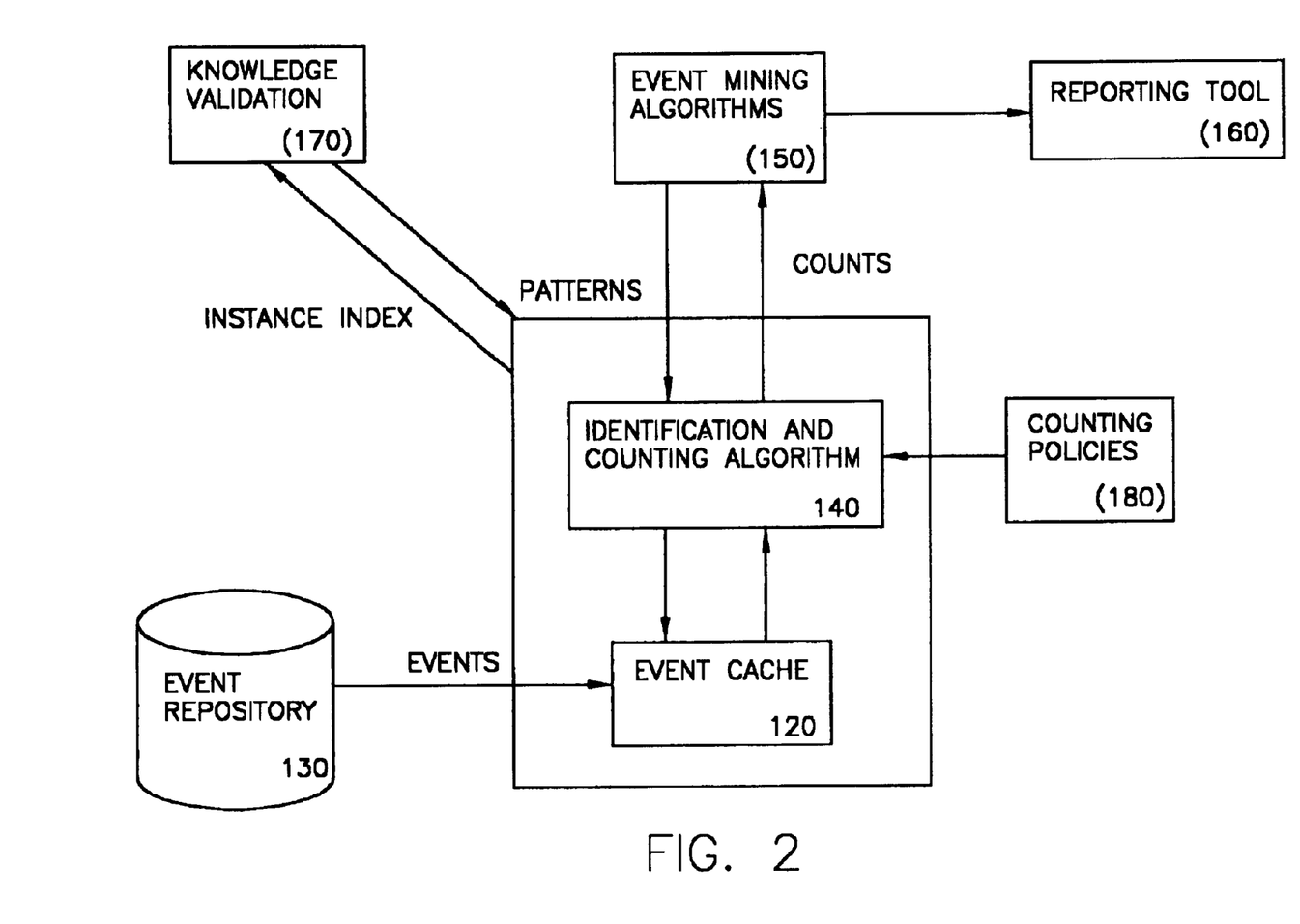
FIG. 2 illustrates offline event mining.

Similar architecture can be used to support off-line analysis. Thus, FIG. 2 shows how a counting algorithm may work in the off-line scenario. For the most part, the components of FIG. 2, as well as the interrelationships between components, are similar to what is shown in FIG. 1. The difference is that, instead of receiving incoming events directly from the event source as in FIG. 1, the event cache receives events from an event repository (130).

FIG. 3 shows a basic concept of patterns. For an event mining system to be reasonable and practical, an assumption called "finite effectiveness" must be made, which means that an event cannot be related to other events that are temporally far apart from it. The concept of windows is introduced to restrict the time span of event patterns. However, dividing event logs into windows does not solve the problem because the nature of time is continuous; hence, the span of pattern instances may cross the boundary of windows. Hence, it is desirable to use sliding windows to capture every possible pattern instance.

Figure 4:
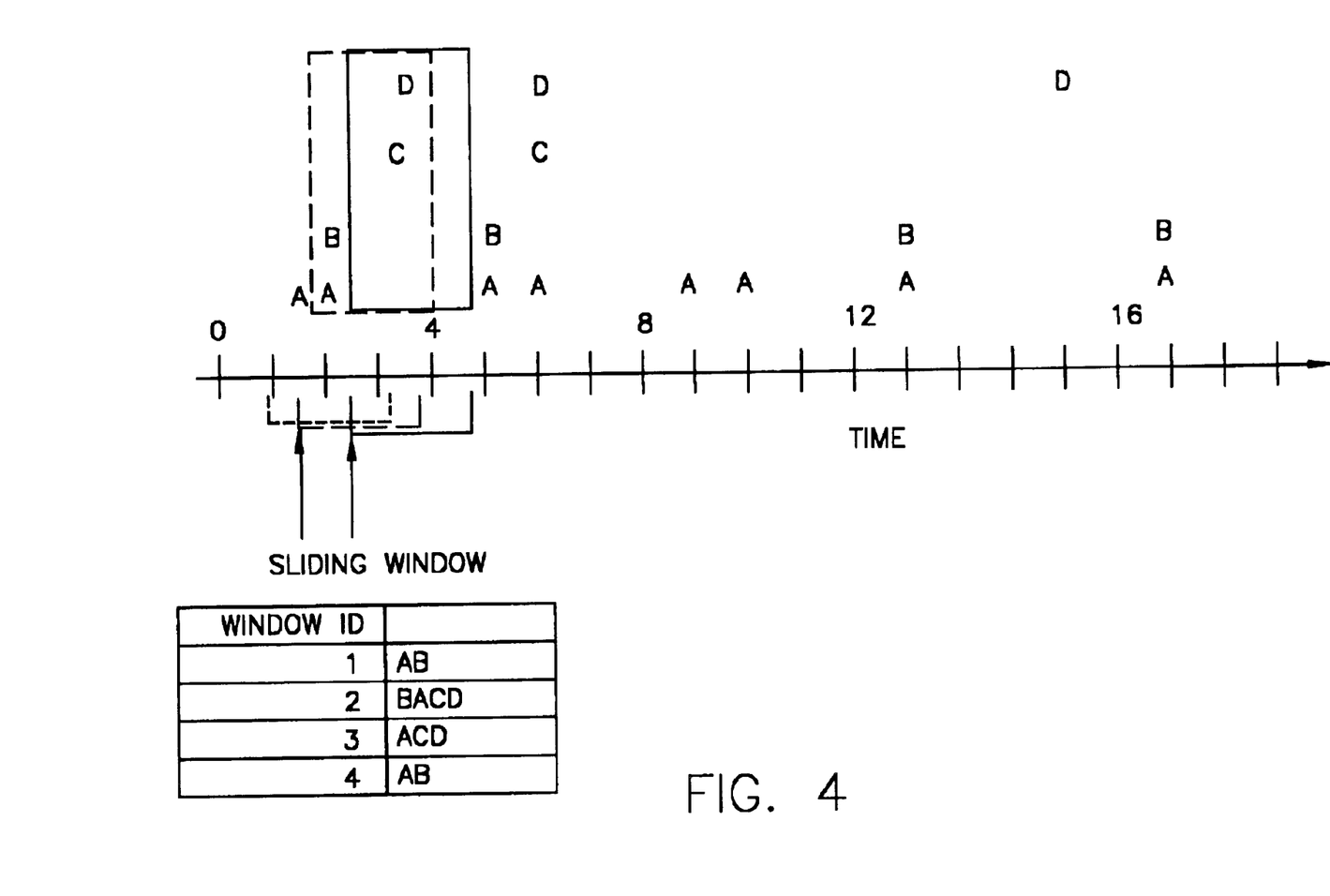
FIG. 4 illustrates overlapping sliding windows.

FIG. 4 is a more detailed illustration of sliding windows. A difficult problem encountered with sliding windows is that one pattern instance may appear in many windows, and thus cause a multiple count. For example, as shown, the same instance of pattern {a,b} appears in both window 4 and window 5. But, undoubtedly, this instance should be counted only once. Also, it is possible for an event to be counted as different pattern instances in different windows. For example, event b at time 2 and event a at time 1 form an instance of pattern {a,b} in window 1. However, the same event b and event a at time 3 form another instance of pattern {a,b}, assuming the order of events in patterns can be ignored.

From the point of view of computation, the avoidance of redundant counting for the purpose of increasing efficiency is also important. If counting one event requires one unit of CPU time, then a direct count of window 3 will thus require 3 units of CPU time. However, in accordance with an embodiment of the present invention, since the content of window 2 is known, one may simply remove event b at time 2 out of the window and add in events at time 4 (none in this case) to the window. Thus the new way of counting would require only 1 unit of CPU time.

Figure 5:
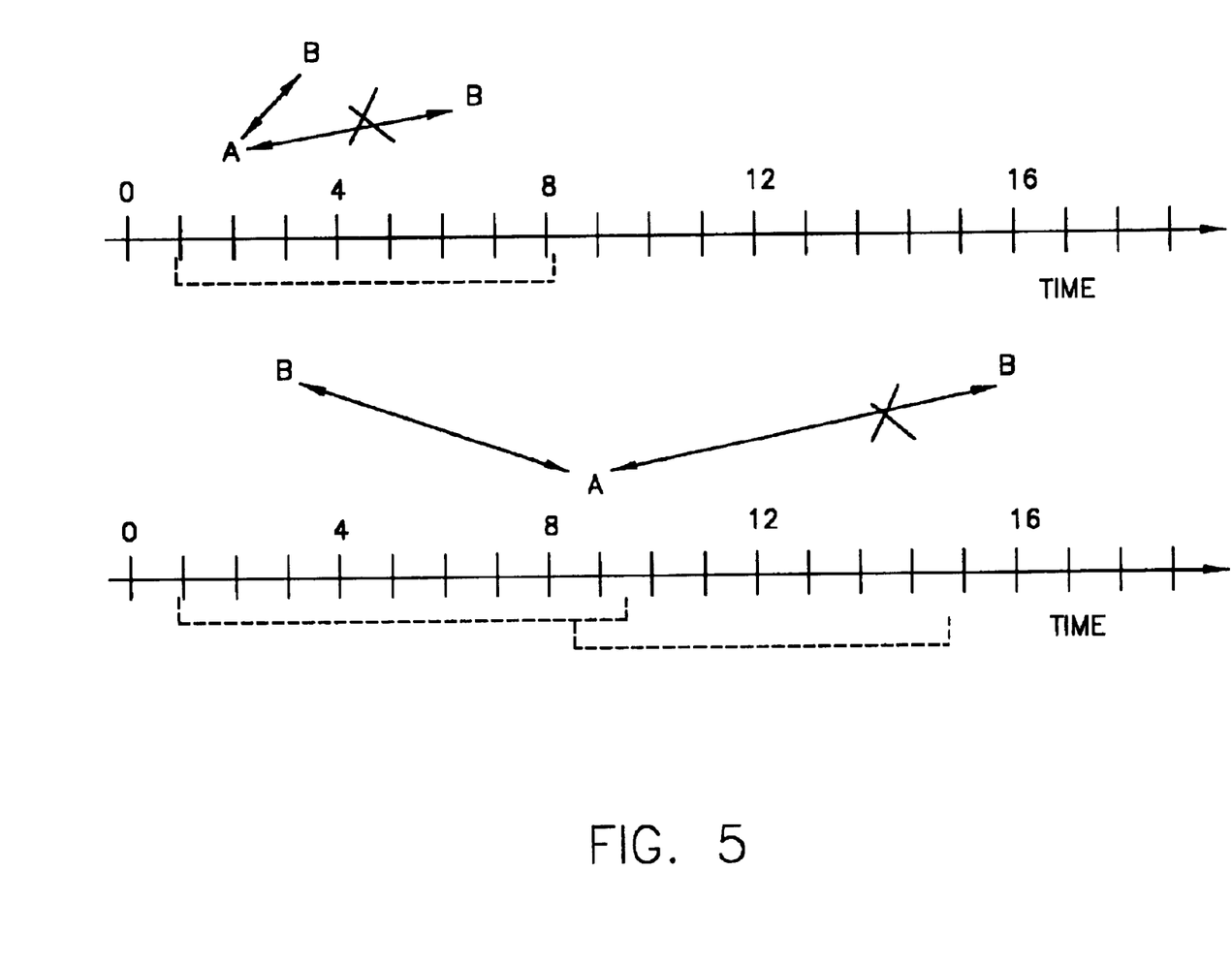
FIG. 5 schematically illustrates the application of a "no reuse" policy.

FIG. 5 illustrates the "No Reuse" policy, in accordance with an embodiment of the present invention. This policy simply prescribes that an event should only be counted at most once and not to be shared in different pattern instances. Additional details relating to FIG. 5 are provided further above.

Figure 6:
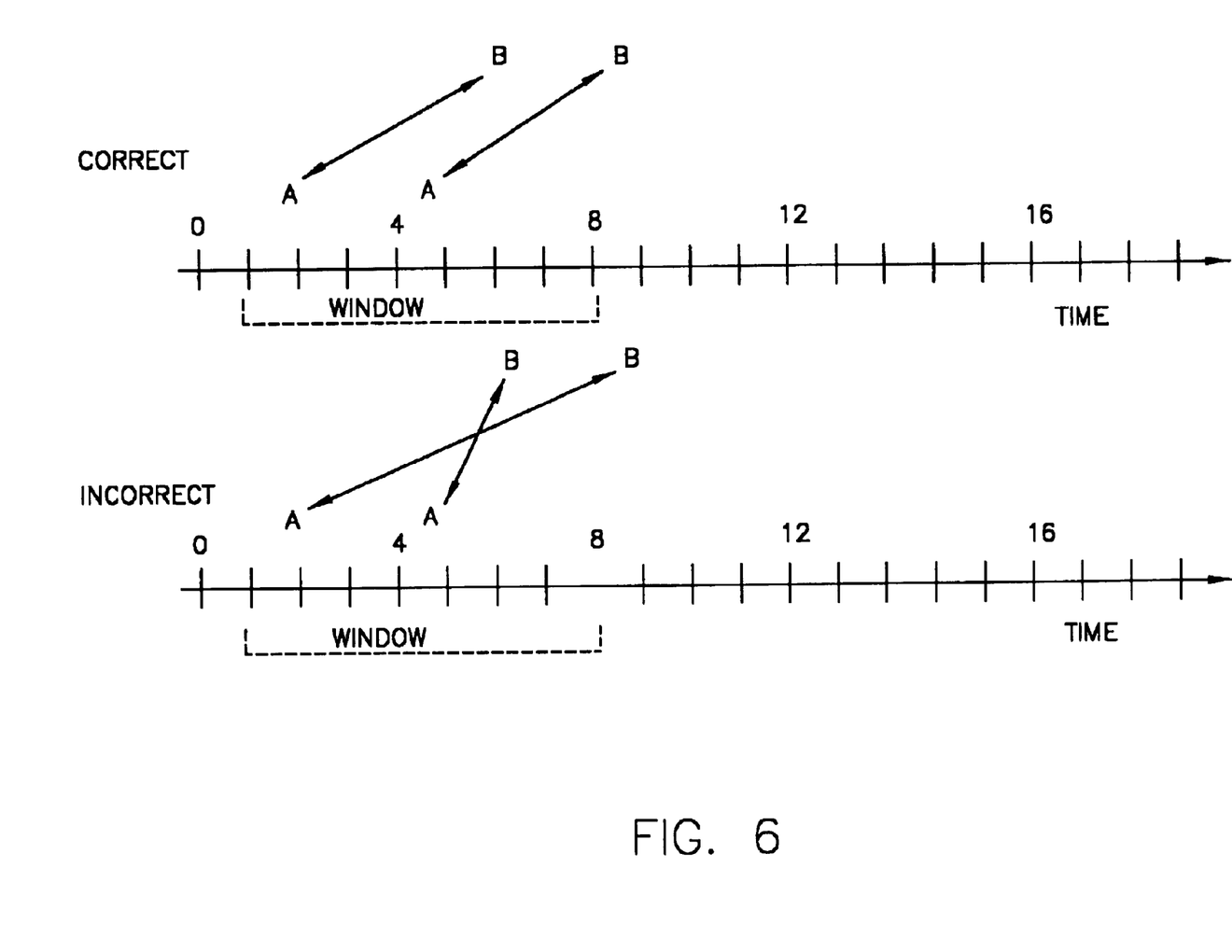
FIG. 6 schematically illustrates the application of an "earliest first" policy.

FIG. 6 illustrates the "Earliest First" policy, in accordance with an embodiment of the present invention. The "No Reuse" policy alone may not be sufficient for determining a unique composition of a pattern. In FIG. 6, there are two possible combinations for the pattern {a,b}. The "earliest first" policy assures that only one combination is legitimate. The policy simply prescribes that the pattern instance that includes events with the earliest time stamps should always be selected. The same operation then works on the rest of the events. Thus, the pattern instances are determined uniquely.

Figure 7:
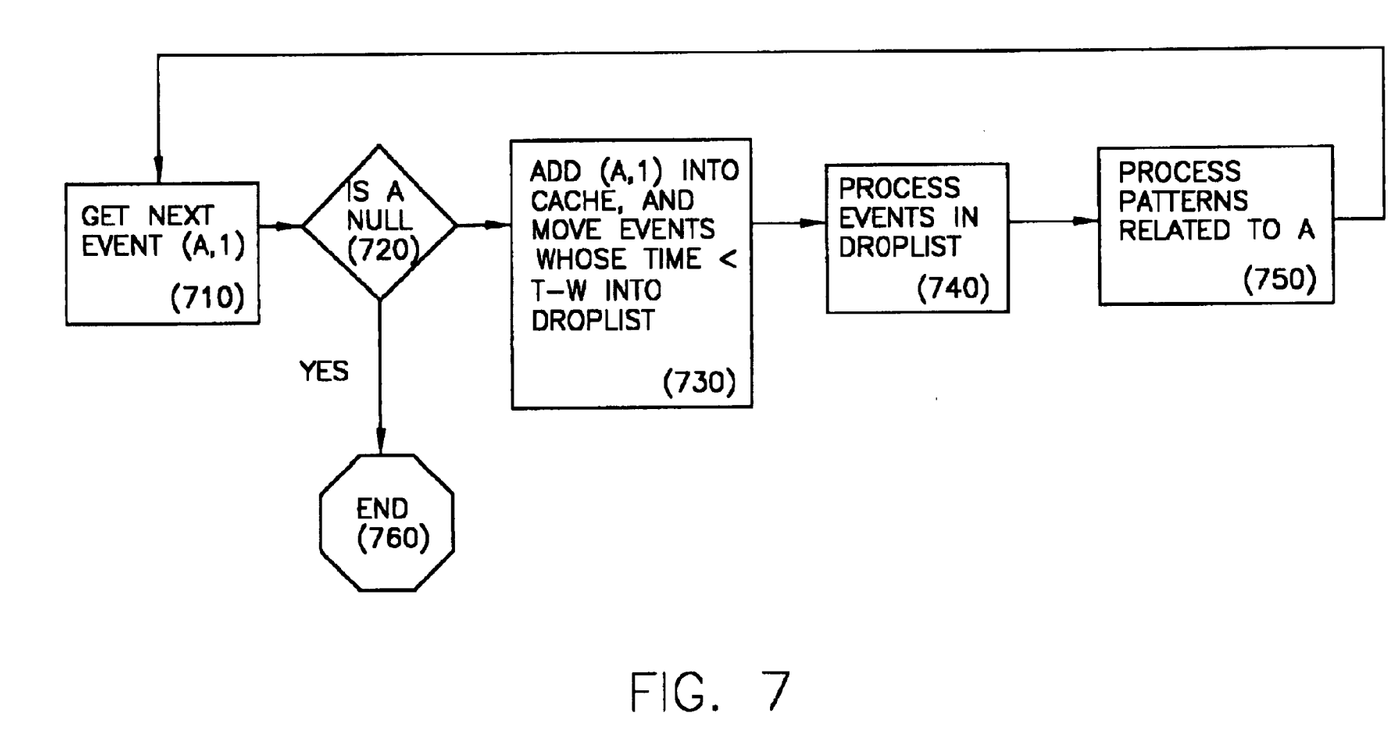
FIG. 7 illustrates an algorithm in accordance with at least one embodiment of the present invention.

FIG. 7 is an overview of an algorithm in accordance with an embodiment of the present invention. The counting algorithm takes events from event stream (710) as input. The termination condition (720) involves finding that the event stream cannot supply more events. When the system takes a new event in, it first decide the new boundary of the sliding window and the events that have dropped out of the new window (730). Then it updates counters according to those dropped events (740). Then, the counters are updated according to the new event (750).

Figure 8:
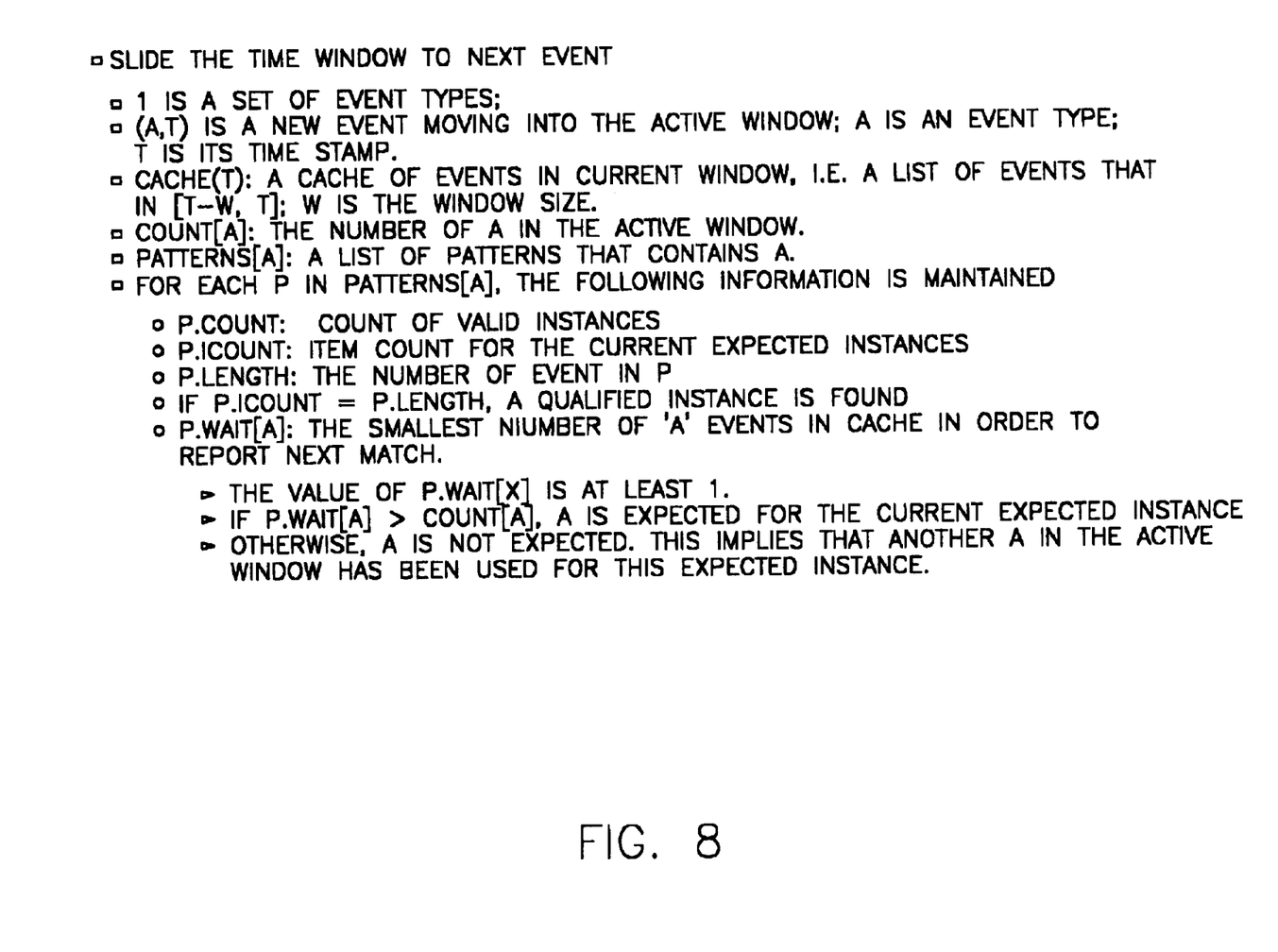
FIG. 8 enumerates details on data structure.

FIG. 8 enumerates the data structures used in the algorithm. As shown, there is preferably an event cache, global counters of found pattern instances and counters for every pattern.

Figure 9:
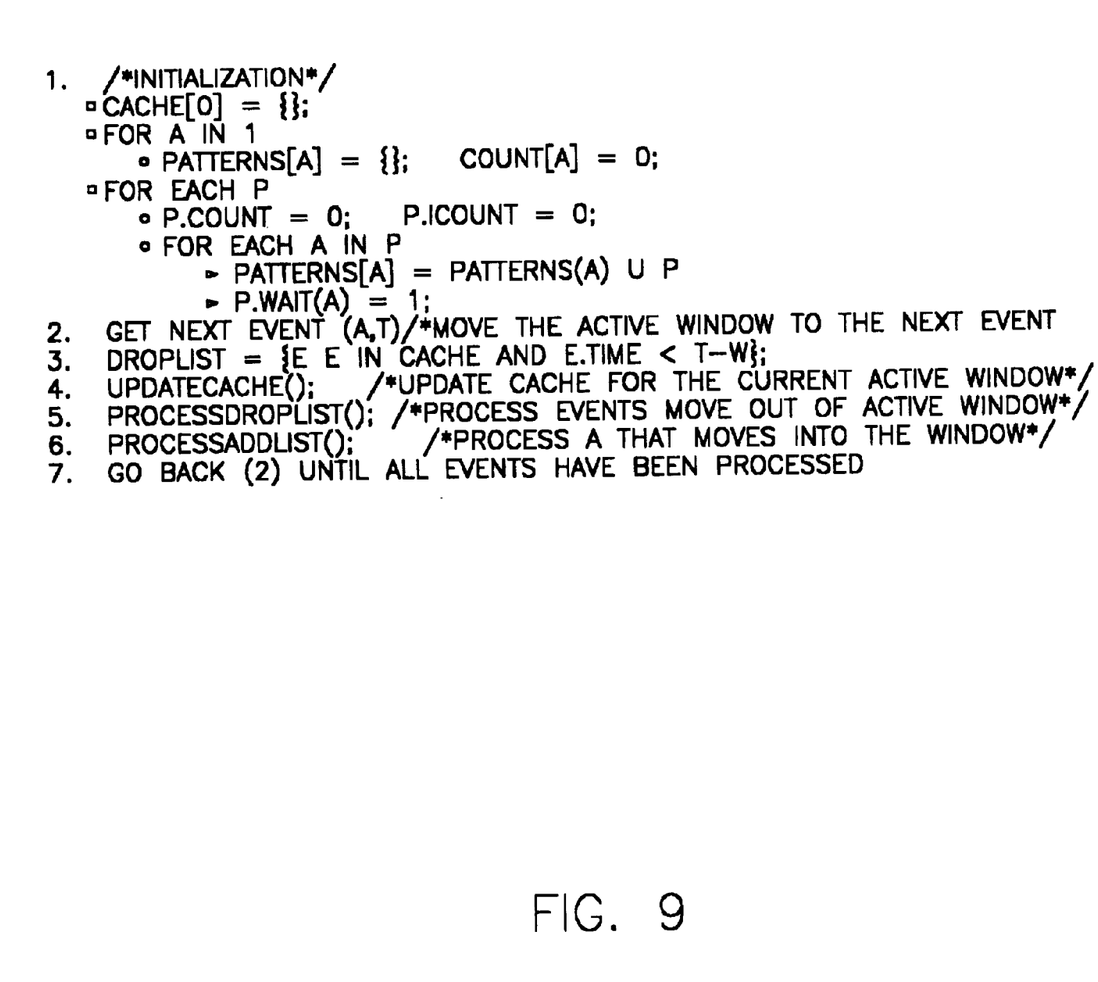
FIG. 9 provides a main algorithm.

FIG. 9 illustrates main algorithm and, as such, conforms to the flow chart in FIG. 7. Step 1 initializes the event cache and counters. Steps 2 to 7 represent an iterative loop which advances on every event coming in the sliding window. Accordingly, Step 2 gets the next event. The timestamp t of the event defines a new active windows. Step 3 finds the set of events in the previous active window but now falls out of the new window. Step 4 refreshes the content of the new window (i.e., deletes DropList and adds (A,t)). Step 5 invokes the procedure in FIG. 10. Step 6 invokes the procedure in FIG. 11.

Figure 10:
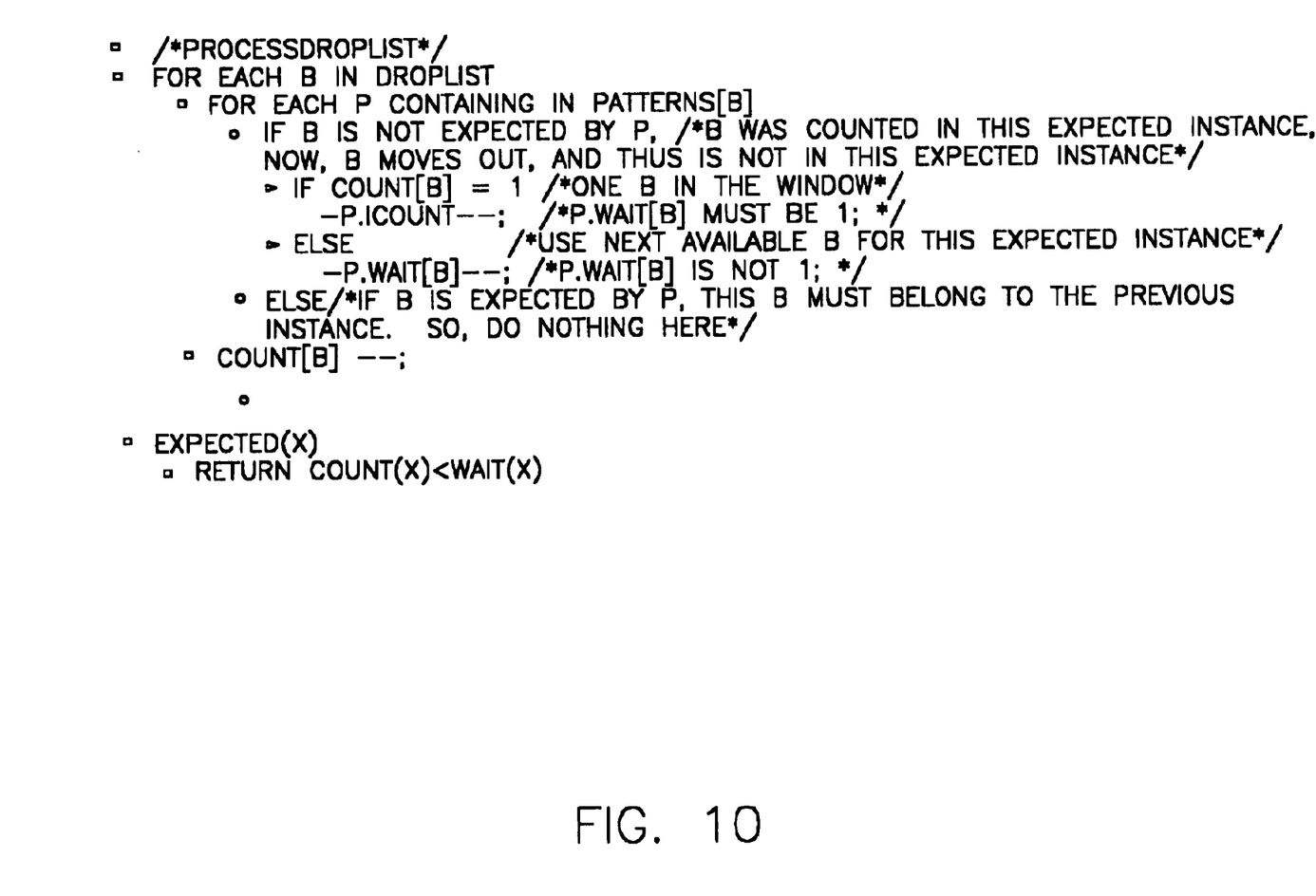
FIG. 10 relates to process events moving out of a window.

FIG. 10 indicates the process of events moving out of a window. The main issue to be addressed is whether the dropped event is part of a partially matched pattern instance and whether there is another event of the same type that can fill in the vacancy. If a dropped event is part of a partially matched pattern instance and there is nothing to fill in, then the algorithm has to decrease the count p.icount to indicate now this type of event is needed.

Figure 11:
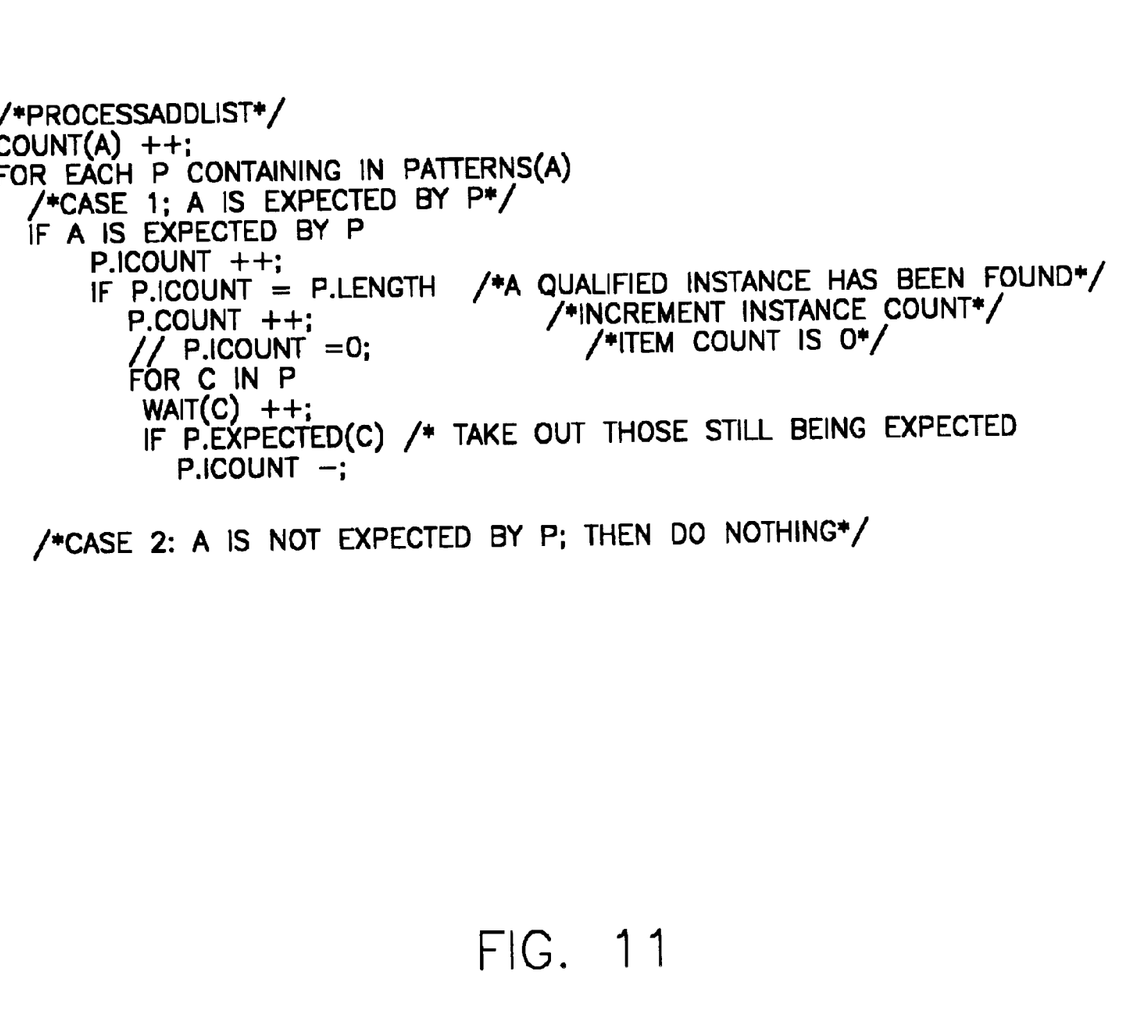
FIG. 11 relates to processing an event that moves into an active window.

FIG. 11 shows the process of an event that moves into an active window. If the event is expected and p.icount is equal to the pattern's length, then a pattern instance is found. Otherwise, the counters are simply updated and the algorithm continues.

Figure 12:
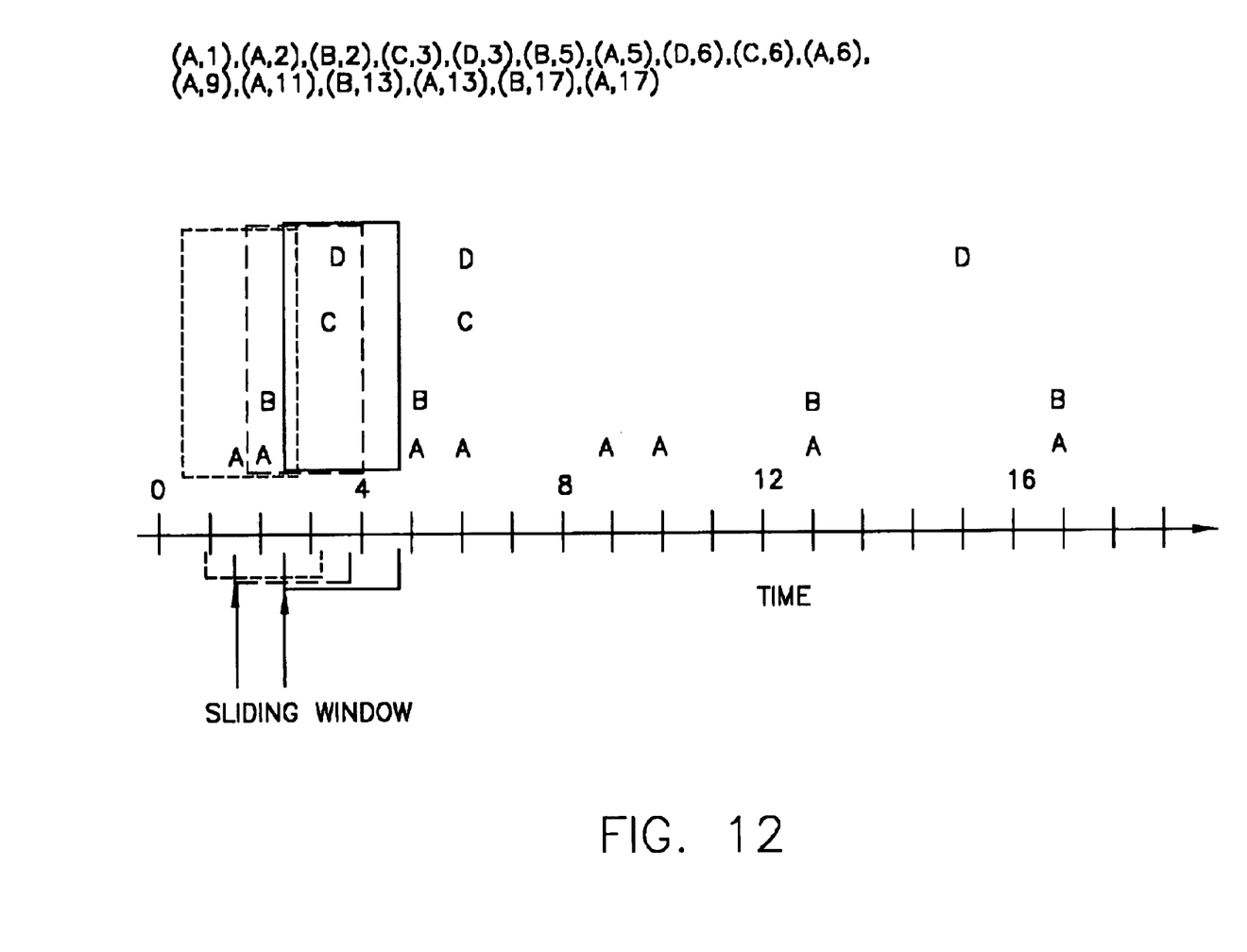
FIG. 12 illustrates a working example.
Figure 13:
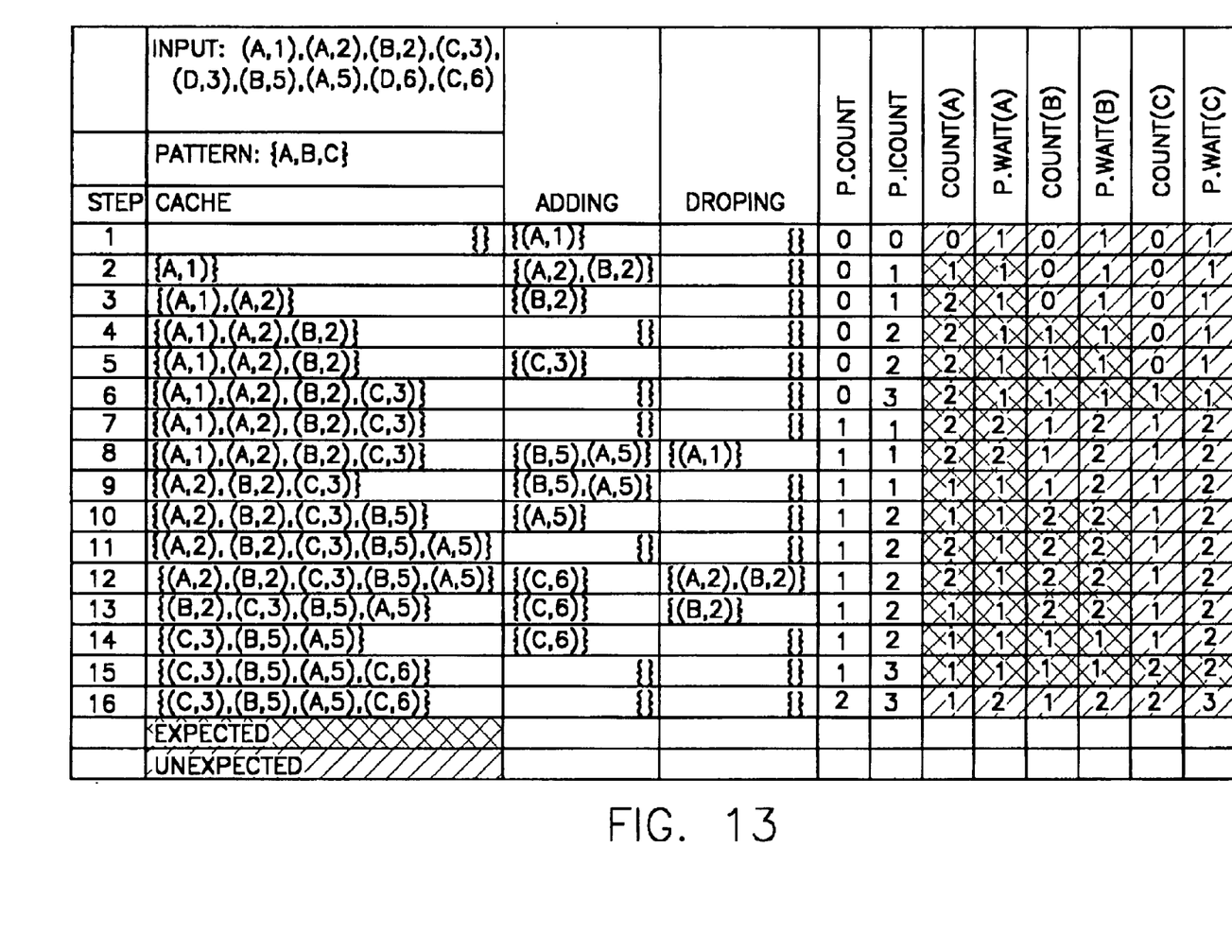
FIG. 13 is a table illustrating step-by-step execution of an algorithm in accordance with an embodiment of the present invention.

FIG. 12 illustrates a working example, showing the input event stream. FIG. 13, on the other hand, is a table illustrating the step-by-step execution of the algorithm in connection with the working example of FIG. 12. In FIG. 13, cells that are darkly shaded indicate that the corresponding event is expected (i.e., needed in order to yield the next match). Lightly shaded cells represent events that are not expected.

FIG. 12 shows a sequence of events in textual and graphical representations. Suppose the window size is set to 4 and the pattern to be counted is {a,b,c}. FIG. 13 shows the value of every variable in each step. Column 'Cache' shows the content of the Cache (active window). "Adding" represents the incoming event set. Here, one adds events with same timestamp at once. "Dropping" represents the outgoing event set. The column "p.count" represents the number of pattern instances found so far. The column "p.icount" represents the number of event types in the pattern already satisfied. Other counters present in FIG. 13 are already defined with respect to FIG. 8.

It is to be understood that the present invention, in accordance with at least one presently preferred embodiment, includes at least one component which identifies temporal pattern instances and an arrangement for caching events. Together, the aforementioned "at least one component" and caching arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer implemented temporal data-mining system comprising:
   an arrangement for counting and identifying instances of temporal patterns;
   said counting and identifying arrangement comprising:
      at least one component which identifies temporal pattern instances; and
      an arrangement for caching events; and
   said counting and identifying arrangement being adapted to implement at least one counting policy related to the identification of temporal pattern instances, wherein the at least one counting policy includes an earliest-first policy and a no-reuse policy.

2. The system according to claim 1, wherein said counting and identifying arrangement employs a sequential algorithm for counting and identifying temporal pattern instances.

3. The system according to claim 2, wherein the algorithm is adapted to maintain a local cache of stored events from a predetermined number or previous time slots.

4. The system according to claim 2, wherein the algorithm employs a per-pattern data structure for keeping track of the state of each temporal pattern.

5. The system according to claim 2, wherein the algorithm includes an indexing scheme for fast-retrieving temporal patterns related to an item.

6. A computer implemented method of facilitating temporal data-mining, said method comprising the steps of:

counting and identifying instances of temporal patterns;

said counting and identifying step comprising:
        identifying temporal pattern instances;
        caching events; and
        implementing at least one counting policy related to the identification of temporal pattern instances:

said step of implementing at least one counting policy comprising implementing an earliest-first policy and a no-reuse policy.

7. The method according to claim 6, wherein said counting and identifying step comprises applying a sequential algorithm for counting and identifying temporal pattern instances.

8. The method according to claim 7, wherein said step of applying a sequential algorithm comprises maintaining a local cache of stored events from a predetermined number of previous time slots.

9. The method according to claim 7, wherein said step of applying a sequential algorithm comprises employing a per-pattern data structure for keeping track of the state of each temporal pattern.

10. The method according to claim 7, wherein said step of applying a sequential algorithm comprises employing an indexing scheme for fast-retrieving temporal patterns related to an item.

11. A program storage device readable by machine, tangibly embodying a program of instructions executable by the machine to perform method steps for facilitating computer implemented data-mining, said method comprising the steps of:

counting and identifying instances of temporal patterns;

said counting and identifying step comprising:
        identifying temporal pattern instances;
        caching events; and
        implementing at least one counting policy related to the identification of temporal patterns instances;

said step of implementing at least one counting policy comprising complementing an earliest-first policy and as no-reuse policy.

* * * * *

UNITED STATES PATENT AND TRADEMARK OFFICE
CERTIFICATE OF CORRECTION

PATENT NO. : 6,907,426 B2
APPLICATION NO. : 09/860154
DATED : June 14, 2005
INVENTOR(S) : Hellerstein et al.

It is certified that error appears in the above-identified patent and that said Letters Patent is hereby corrected as shown below:

Column 9, Line 8, "instances:" should read -- instances; --

Column 10, Line 19, Claim 11 "complementing" should read -- implementing --

Column 10, Line 20, Claim 11 "as" should read -- a --

Signed and Sealed this

Third Day of April, 2007

JON W. DUDAS
*Director of the United States Patent and Trademark Office*